E. E. F. CREIGHTON.
PROTECTIVE DEVICE.
APPLICATION FILED JULY 21, 1916.

1,300,127.

Patented Apr. 8, 1919.

Inventor:
Elmer E. F. Creighton,
by
His Attorney.

UNITED STATES PATENT OFFICE.

ELMER E. F. CREIGHTON, OF SCHENECTADY, NEW YORK, ASSIGNOR TO GENERAL ELECTRIC COMPANY, A CORPORATION OF NEW YORK.

PROTECTIVE DEVICE.

1,300,127.       Specification of Letters Patent.       Patented Apr. 8, 1919.

Application filed July 21, 1916. Serial No. 110,607.

*To all whom it may concern:*

Be it known that I, ELMER E. F. CREIGHTON, a citizen of the United States, residing at Schenectady, county of Schenectady, State of New York, have invented certain new and useful Improvements in Protective Devices, of which the following is a specification.

My invention relates to protective devices and more particularly to devices for protecting against over voltage phenomena due to surges, switching and the like.

The object of my invention is to provide a protective device for electrical apparatus for protecting such apparatus from conditions of over voltage and more particularly the object of my invention is to provide a device for protecting transformers and similar devices from over voltage conditions caused by conditions of resonance and for protecting circuits which accidentally resonate at the frequency of a surge.

It is well known that when surges of high frequencies due to lightning, switching, etc., pass along a transmission line and such surges or wave trains strike transformers or similar devices connected to the line, that such transformers will often break down and become disabled. This is often caused by a condition of resonance within the transformer due to the inductance of the turns of its winding, and the capacitance between coils and between turns, thus providing a circuit which resonates at a certain frequency and thereby permits a building up of excess potentials. When an increment of incoming line surge or wave train penetrates the end coil of a transformer and has a similar frequency to that of the natural frequency of the transformer, then resonant conditions exist and with each succeeding impulse or increment of the surge, the resonant potential is built up higher and higher until the potential exceeds that for which the transformer is insulated, when a puncture of the insulation occurs. It is, therefore, the object of my invention to prevent such conditions from occurring by providing a device so connected to the high tension winding of the transformer, that the voltage which can be impressed on each coil of the transformer is limited, all potentials in excess of this amount being dissipated or absorbed.

Figure 1:
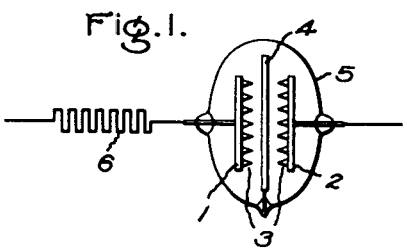
Figure 2:
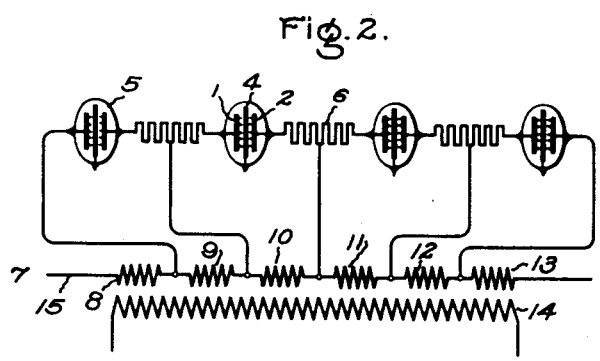
Figure 3:
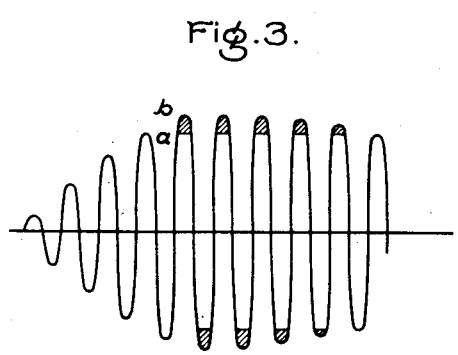
Figure 4:
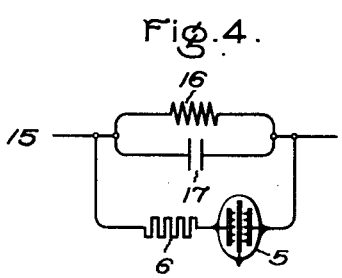

The novel features which I believe to be characteristic of my invention will be definitely indicated in the claims appended hereto; the features of construction and mode of operation will be understood by reference to the following description taken in connection with the accompanying drawings which show the preferred embodiments of my invention and in which Figure 1 shows diagrammatically my novel protective device, Fig. 2 is a diagrammatic illustration of a transformer embodying the novel features of my invention, Fig. 3 shows a curve of the resonant potential rise in the transformer produced by an incoming wave train, and Fig. 4 is a diagrammatic illustration of the connections of my novel protective device to a resonant circuit to be protected.

My novel protective device as shown in Fig. 1 consists of a discharge gap device comprising electrodes 1 and 2 terminating in a plurality of sharp members or needle points 3, the electrodes being spaced apart and separated by a wall or member 4 of insulating material of such dielectric strength that the discharge from the needle points 3 will not puncture it and cause the dynamic energy to follow. The electrodes with the partition or barrier 4 are preferably inclosed in a suitable vessel 5 which may contain air, an evacuated atmosphere, or an atmosphere of vapors or fluids depending on the conditions to be met.

My discharge gap device is provided with a sufficient number of needle points 3 in relation to the capacitance of the coils and the safe potential which can be impressed on them, so that a brush discharge always takes place between the points of the electrodes 1 and 2 for a predetermined voltage above normal. In this manner, the excess potential is always dissipated as heat without producing any detrimental conditions on the circuit whereas if the excess potential produced a spark discharge rather than a brush discharge, the spark would produce other oscillations on the circuit which may augment the oscillatory conditions already existing and then again difficulties may be encountered with spark discharges owing to the persistence of the dynamic current which transforms the spark discharge into an arc discharge. By the term "brush discharge," I desire it understood that I mean, any discharge which takes place from the needle points without producing a continuous conducting circuit from one electrode to the other. In other words, by the term "brush discharge" I do not intend to limit the discharge necessarily to the blue brush discharge but such may be what is called a spark brush discharge.

Connected in series with my brush discharge or energy dissipating device, I have shown a resistance 6 which may or may not be used. The resistance when used acts as an extra absorber and safety device to limit the maximum current at the needle points. If there is no insulating barrier 4 used between the electrodes 1 and 2 a high resistance is desirable but with the barrier, the resistance may be made much lower since it then is used also to limit the dynamic current in case of such conditions as accidental puncture of the barrier 4.

In Fig. 2 is shown diagrammatically the high tension winding 7 of a transformer having coils 8, 9, 10, 11, 12 and 13 coöperating with a low tension winding 14. It is understood that this is illustrative of the means for protecting any similar electrical winding. For protecting a winding of this character from incoming wave trains or surges, I preferably connect one of my protective units or devices in shunt to each of the coils or sections 9, 10, 11, and 12 as shown, which performs the function of a resonance absorber or peak potential arrester, that is, when the voltage across any coil builds up, due to resonance, to an amount sufficient to brush discharge over the electrodes 1 and 2, the peak of the potential wave is picked off and dissipated as heat which prevents the voltage from building up any higher than the potential.

The theory of operation of my device in protecting a transformer may be explained as follows: A surge of high frequency coming in over the conductor 15, for instance, is a wave train with an logarithmic decrement, that is, a wave train having a decreasing amplitude of vibration. When such a wave train strikes the end coil 8 of the high tension winding 7, due to its inductance a greater part of the wave is reflected back along the conductor 15 but a portion or increment of the wave train penetrates through the inductance of the end coil 8 and into the local electrostatic capacity or capacitance of the transformer windings 9, 10, etc. The transformer winding 7 consists essentially of a circuit having inductance and capacitance in parallel, as is shown in Fig. 4, which circuit is oscillatory and is protected by my protective device in shunt or in parallel to the circuit. The inductance 16 represents the inductance of the windings of the coils 9, 10, etc., while the capacitance 17 represents the capacitance between coils 9, 10, etc., which is in parallel to the inductance. It will be apparent that such a circuit is a resonant circuit for a wave train of a predetermined frequency. When, therefore, a wave train strikes the end coil 8 as an inductance and an increment thereof passes into the transformer or the resonant circuit, if the frequency of the surge corresponds to natural frequency of the circuit, the circuit resonates and with each succeeding impulse or increment of the surge as it is reflected back and forth along the conductor 15, the voltage of the resonant circuit rises higher and higher. Due as is well known to the gradual transfer of energy from the surge on the conductor 15, to the resonant circuit, the limit of potential which can be obtained is only limited by the dielectric strength of insulation. The building up of the potential in the transformer by resonance is shown by the curve in Fig. 3 where at each cycle an increment of the surge is added.

By shunting each coil except the end coils of the transformer by my protective device, the maximum potential that can be impressed across each coil can be limited to any amount desired. As shown in Fig. 3 the potential is limited for instance to that shown at $a$ on the curve. Each coil to be protected has a definite capacitance between turns and to the adjacent coil and has also a definite limit of safe voltage determined by the insulation. As soon as the potential builds up above the maximum value, the excess is dissipated as a brush discharge across the needle points 3 of electrodes 1 and 2. The safe quantity is found by the product of the capacitance and the safe voltage; and the safe displacement current in the insulation, that is, the safe charging current in the capacitance, is found by the product of the safe quantity and $2\Pi$ times the frequency. The number of needle points, therefore, comprising each electrode whereby a brush discharge is always produced, is determined by the size of the increment entering the resonant circuit. Every coil has a constant expressible in mathematical symbols, which determines how rapidly an oscillation may grow or decay. The number of needle points must be sufficient to carry the increment per cycle. In other words the number of needle points must be sufficient to carry as much current by brush discharge, at the maximum safe voltage, as is needed to absorb the increment of the incoming surge. By providing the electrodes 1 and 2 with the desired number of needle points 3, as soon as the potential across any coil reaches that required to discharge across the gaps between the needle points, the beginning of which discharge is at a potential somewhat less than shown at $a$ on the curve of Fig. 4, the protective device will operate and a brush discharge will take place which picks off the peak $a$, $b$ of the potential wave, which portion is shown shaded, and dissipates the same as heat without producing the detrimental conditions which would be the case of a spark discharge. Brush discharge will take place at each succeeding impulse at each cycle until the potential is reduced below the value which will cause brush discharge. As already intimated the value of potential to cause a heavy brush discharge is less than the limiting strength of the insulation.

My invention may be embodied in many other forms than that shown and described and I, therefore, do not wish to be restricted to the precise construction shown but intend to cover by the appended claims all changes and modifications within the spirit and scope of my invention.

What I claim as new, and desire to secure by Letters Patent of the United States, is:—

1. The combination with an oscillatory circuit, of a device in parallel thereto for dissipating the energy of said circuit in excess of a predetermined amount comprising coöperating electrodes terminating in a plurality of discharge points, and a solid insulating barrier between said discharge points to limit the discharge across said electrodes to a brush discharge.

2. The combination with an oscillatory circuit having a certain logarithmic increment, of a protective device in parallel thereto comprising coöperating electrodes terminating in a plurality of discharge points, the number of discharge points being sufficient to carry said logarithmic increment per cycle.

3. The combination with a circuit to be protected, of means for preventing a rise of potential in said circuit above a predetermined amount comprising coöperating electrodes spaced apart and connected in shunt to said circuit, a plurality of pointed discharge members for each electrode acting to dissipate the potential in excess of said predetermined amount as brush discharge, and a solid insulating member between said electrodes to limit said discharge to a brush discharge.

4. The combination with a resonant circuit, of a protective device connected in shunt to said circuit comprising a brush discharging means operative to dissipate the energy of said resonant circuit in excess of a predetermined amount, and means for preventing said means from spark discharging.

5. The combination with a resonant circuit, of a resonance absorber comprising means operative on a rise of potential above a predetermined amount for dissipating the potential above said predetermined amount as a brush discharge, and means for limiting said discharge to a brush discharge.

6. The combination with an electrical winding provided with a plurality of sections, of means for protecting each section comprising coöperating electrodes having a plurality of pointed discharge members, a solid insulating barrier between said members, said discharge members limiting the potential which can be impressed on each section to a safe amount and dissipating all potentials above said safe amount as brush discharge.

7. A protective device comprising coöperating electrodes provided with a plurality of discharge points and spaced apart to form a plurality of discharge gaps, a solid barrier of insulating material between said electrodes coöperating with said discharge points to limit the discharge to a brush discharge, and a vessel inclosing said electrodes and barrier.

8. A protective device comprising coöperating electrodes terminating in a plurality of points and spaced apart to form a plurality of discharge gaps in parallel, a solid insulating barrier between said discharge points coöperating therewith to limit the discharge within said device to a brush discharge.

In witness whereof, I have hereunto set my hand this 14th day of July, 1916.

ELMER E. F. CREIGHTON.